US012350598B2

(12) United States Patent
Negron

(10) Patent No.: US 12,350,598 B2
(45) Date of Patent: Jul. 8, 2025

(54) DOMINO BOX WITH INTEGRATED STANDS

(71) Applicant: Bernardo Negron, Bolton, CT (US)

(72) Inventor: Bernardo Negron, Bolton, CT (US)

( * ) Notice: Subject to any disclaimer, the term of this patent is extended or adjusted under 35 U.S.C. 154(b) by 65 days.

(21) Appl. No.: 18/387,832

(22) Filed: Nov. 7, 2023

(65) Prior Publication Data

US 2025/0144507 A1    May 8, 2025

(51) Int. Cl.
*A63F 9/20* (2006.01)
*B33Y 80/00* (2015.01)
*B65D 1/34* (2006.01)
*B65D 25/20* (2006.01)

(52) U.S. Cl.
CPC .................. *A63F 9/20* (2013.01); *B65D 1/34* (2013.01); *B65D 25/20* (2013.01); *B33Y 80/00* (2014.12)

(58) Field of Classification Search
CPC ....... A63F 9/20; A63F 2009/205; B65D 1/34; B65D 25/20
USPC ................... 273/236, 148 A, 309; 217/12 R; 220/615, 4.11, 4.09, 4.29, 4.27, 4.28, 4.26
See application file for complete search history.

(56) References Cited

U.S. PATENT DOCUMENTS

| | | | | |
|---|---|---|---|---|
| 1,479,350 A | * | 1/1924 | Wiel | A63F 9/20 D21/392 |
| 1,484,472 A | * | 2/1924 | Cowen | A63F 1/10 273/150 |
| 1,529,915 A | * | 3/1925 | Pugh | A63F 9/20 273/148 R |
| 1,569,701 A | * | 1/1926 | Bostrom | A63F 9/20 235/1 B |
| 4,453,714 A | * | 6/1984 | Houser | A63F 3/06 273/148 A |
| 5,586,764 A | * | 12/1996 | Katz | A63F 1/02 273/293 |
| 6,168,156 B1 | | 1/2001 | Gonzalez | |
| 6,311,858 B1 | * | 11/2001 | Csiszar | B65D 90/023 220/4.03 |
| 7,568,698 B2 | * | 8/2009 | Bertrand | A63F 1/10 273/148 R |
| 2023/0132650 A1 | * | 5/2023 | Devalal | A63F 3/00895 273/292 |

FOREIGN PATENT DOCUMENTS

GB    2185415 A * 7/1987 ............... A63F 1/10

* cited by examiner

*Primary Examiner* — Rafael A Ortiz
(74) *Attorney, Agent, or Firm* — Robert S. Smith

(57) ABSTRACT

A domino box has an elongated cuboid shell having a rectangular top and bottom faces and rectangular first and second side faces. The elongated cuboid hollow shell has an elongated cuboid space within the shell. The elongated cuboid space has a rectangular top and bottom faces as well as rectangular first and second side faces. Each of the top and bottom faces of the elongated cuboid space are disposed in oblique relationship to the top and bottom faces of the elongated cuboid shell, each of the first and second side faces of the elongated cuboid space are disposed in oblique relationship to the first and second side faces of the elongated cuboid shell.

7 Claims, 12 Drawing Sheets

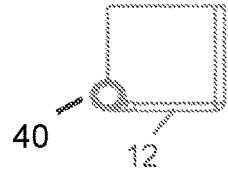
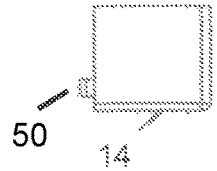
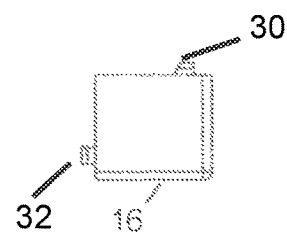
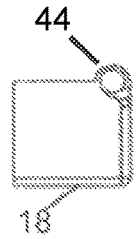
FIG. 8   FIG. 10   FIG. 12   FIG. 14
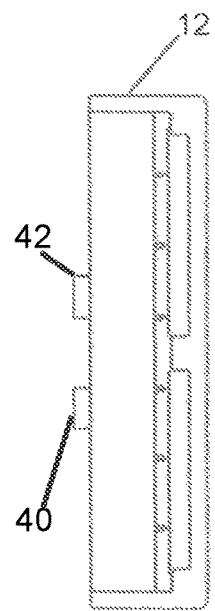
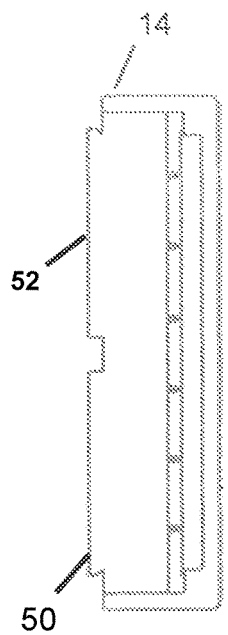
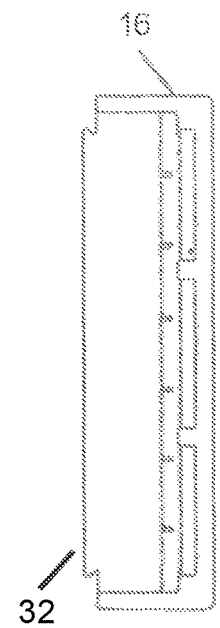
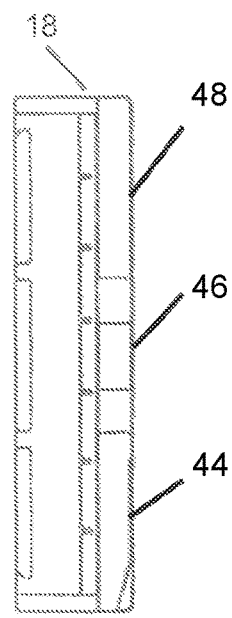
FIG. 9   FIG. 11   FIG. 13   FIG. 15

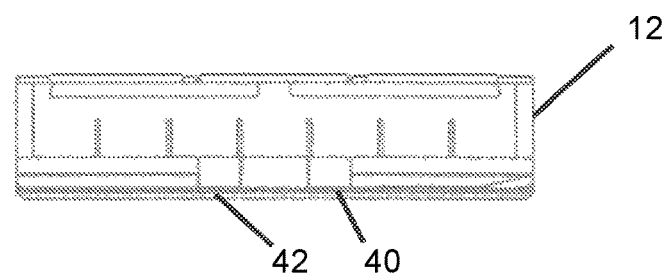
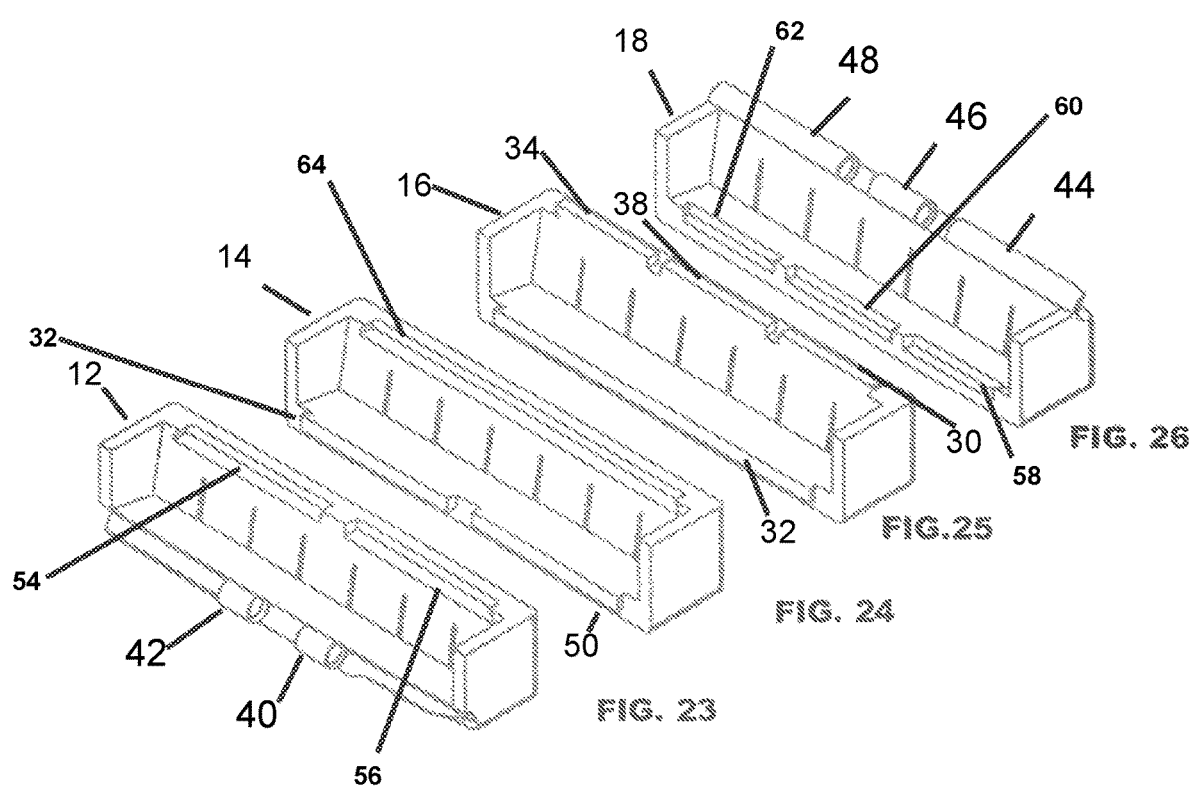

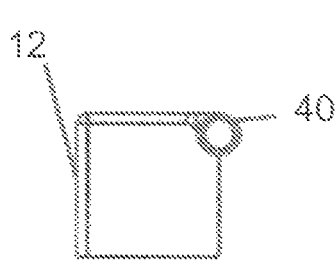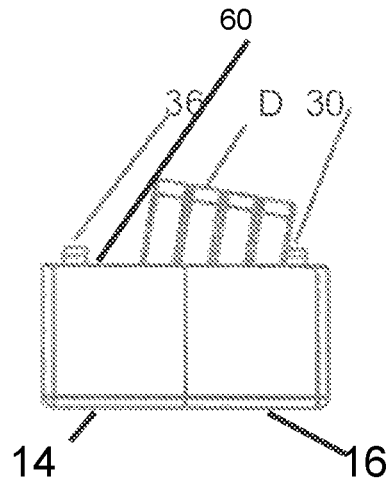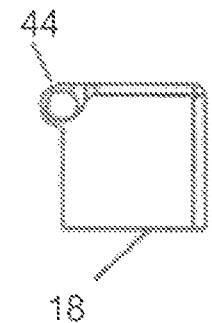
FIG. 28　　　　FIG. 29　　　　FIG. 30
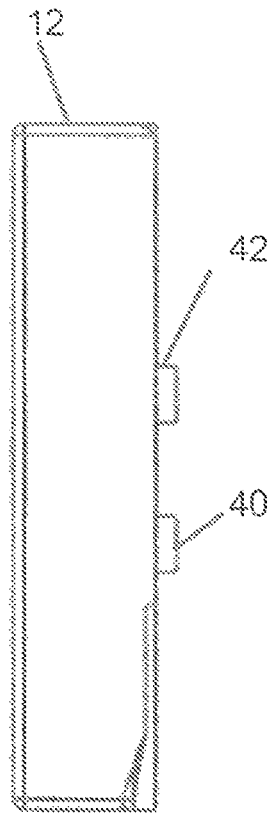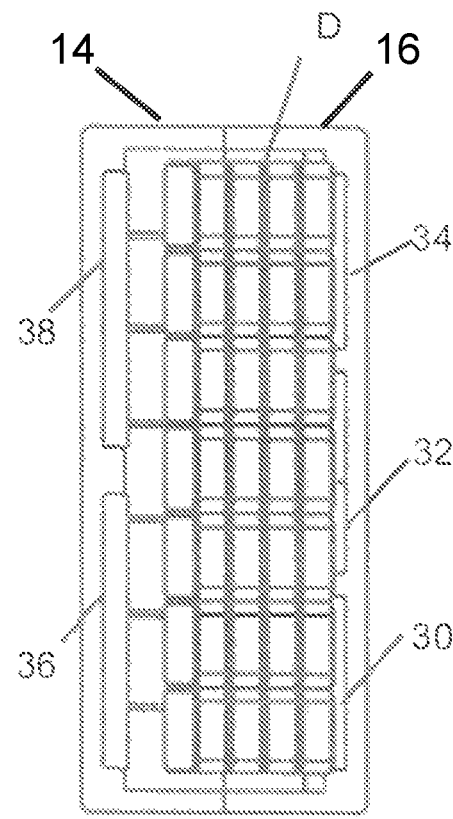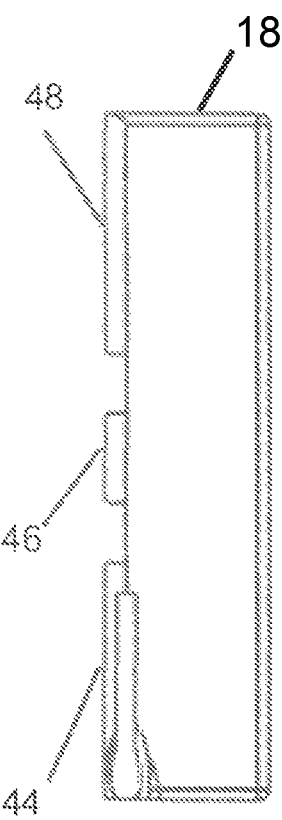
FIG. 31　　　　FIG. 32　　　　FIG. 33

DOMINO BOX WITH INTEGRATED STANDS

TECHNICAL FIELD

The present invention relates generally to apparatus for domino players. Dominoes is a family of tile-based games played with gaming pieces. Each domino is a rectangular tile, usually with a line dividing the face into two square ends. Each end is marked with a number of spots (also called pips or dots) or is blank. The backs of the tiles in a set are indistinguishable, either blank or having some common design. The gaming pieces make up a domino set, sometimes called a deck or pack. The traditional European domino set consists of 28 tiles, also known as pieces, bones, rocks, stones, men, cards or just dominoes. Although the description refers to dominos, it will be understood that the stands that are described in the context of dominos can also be used for use with other games such as mahjong, scrabble, rummikub, etc.

The most basic domino variant is for two players. The 28 tiles are shuffled face down and form the stock or boneyard. Each player draws seven tiles from the stock. Once the players begin drawing tiles, they are typically placed on an edge in front of the players, so players can see their own tiles, but not the value of their opponents' tiles. Players can thus see how many tiles remain in their opponents' hands at all times.

More particularly, the present invention is generally directed to an assembly comprising four cooperating trays for holding the dominos of respective players. The four cooperating trays interconnect in an assembly for holding the deck of dominos as well as a pencil for use in keeping the score during play.

BACKGROUND OF THE INVENTION

The prior art includes U.S. Pat. No. 6,168,156 Gonzalez issued Jan. 2, 2011. That patent describes an assembly having a first pair of inner trays and a second pair of outer trays that are significantly different from the inner trays. More particularly, the inner trays have end walls and the outer trays have no end walls. This results in somewhat of a player inequity because an opponent of a player having an outer tray can potentially see more of the hand of that player. From the above, it is therefore seen that there exists a need in the art to overcome the deficiencies and limitations described herein and above.

SUMMARY OF THE INVENTION

, The shortcomings of the prior art are overcome and additional advantages are provided through a domino box having an elongated cuboid shell having rectangular top and bottom faces and rectangular first and second side faces.

The elongated cuboid hollow shell has an elongated cuboid space within the shell. The elongated cuboid space has a rectangular top and bottom faces as well as rectangular first and second side faces. Each of the top and bottom faces of the elongated cuboid space are disposed in oblique relationship to the top and bottom faces of the elongated cuboid shell, each of the first and second side faces of the elongated cuboid space are disposed in oblique relationship to the first and second side faces of the elongated cuboid shell.

The elongated cuboid hollow shell is divided by a first virtual plane disposed midway between the top and bottom faces as well as parallel to the top and bottom faces and a second virtual plane disposed midway between the first and second side faces as well as parallel to the first and second side faces.

The elongated cuboid hollow shell is divided into first and second elongated cover quadrant sections as well as first and second elongated base quadrant sections. Each of the first and second cover quadrant sections as well as each of the first and second base quadrant sections function as trays for displaying game tiles.

The apparatus may include a first base quadrant section that includes a recess in the bottom thereof; and a second base quadrant section that includes a lip dimensioned and configured for engaging the recess.

The recess in the first base quadrant section may be disposed of in only a part of the thickness of the elongated first base quadrant section. The recess may have one or more pointed extremities. The pointed extremity may be disposed proximate to an axial extremity of the elongated first base quadrant section.

In some embodiments, the first and second elongated cover quadrant sections include respective coaxial sleeves for receiving a writing implement whereby the first and second elongated cover quadrant sections are secured together.

It is an object of the present invention to provide an apparatus that fully seals the contents from contamination.

It is another object of the present invention to provide apparatus that has substantially uniform trays for all players.

It is yet another object of the present invention to provide apparatus that has unique features on individual members to facilitate the users complete assembly of the apparatus.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. Although specific features of various exemplary embodiments of the invention may be shown in some drawings and not in others, this is for convenience only. In accordance with the principles of the invention, any feature of a drawing maybe referenced and/or claimed in combination with any feature of any other drawing.

The invention, however, both as to organization and method of practice, together with the further objects and advantages thereof, may best be understood by reference to the following description taken in connection with the accompanying drawings in which:

FIG. 8 is an end view of the upper left cover 12.

FIG. 9 is a plan view of the upper left cover 12.

FIG. 10 is an end view of the lower left base 14.

FIG. 11 is a plan view of the lower left base 14.

FIG. 12 is an end view of the lower right base 16.

FIG. 13 is a plan view of the lower right base 16.

FIG. 14 is an end view of the upper right cover 18,

FIG. 15 is a plan view of the upper right cover 18.

FIG. 22 is another view of the upper left cover 12.

FIG. 23 is a view of the upper left cover 12 positioned for use as a stand to hold, for example, the dominos in the hand of an individual user.

FIG. 24 is a view of the lower left base 14 positioned for use as a stand to hold, for example, the dominos in the hand of an individual user.

FIG. 25 is a view of the lower right base 16 positioned for use as a stand to hold, for example, the dominos in the hand of an individual user.

FIG. 26 is a view of the upper right cover 18 positioned for use as a stand to hold, for example, the dominos in the hand of an individual user.

FIG. 28 is an end view of the upper left cover 12. positioned for engagement with the left base.

FIG. 29 is an end view of lower bases 14,16 assembled and holding dominos D.

FIG. 30 is an end view of the upper right cover 18 positioned for engagement with the right base.

FIG. 31 is a view of upper left cover 12 positioned for engagement with the assembled elements illustrated in FIG. 32.

FIG. 32 is a top view of lower bases 14,16 assembled and holding dominos.

FIG. 33 is a view of upper right cover 18 positioned for engagement with the lower base 16 illustrated in FIG. 32.

DETAILED DESCRIPTION

Figure 1:
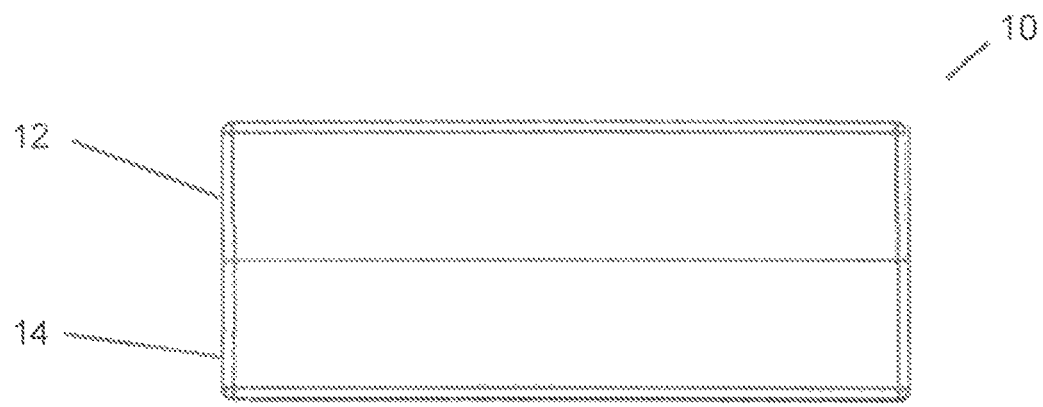
FIG. 1 is a side view of the assembled apparatus upper left cover 12, a lower left base 14, lower right base 16 and an upper right base 18 in accordance with one form of the present invention.
Figure 2:
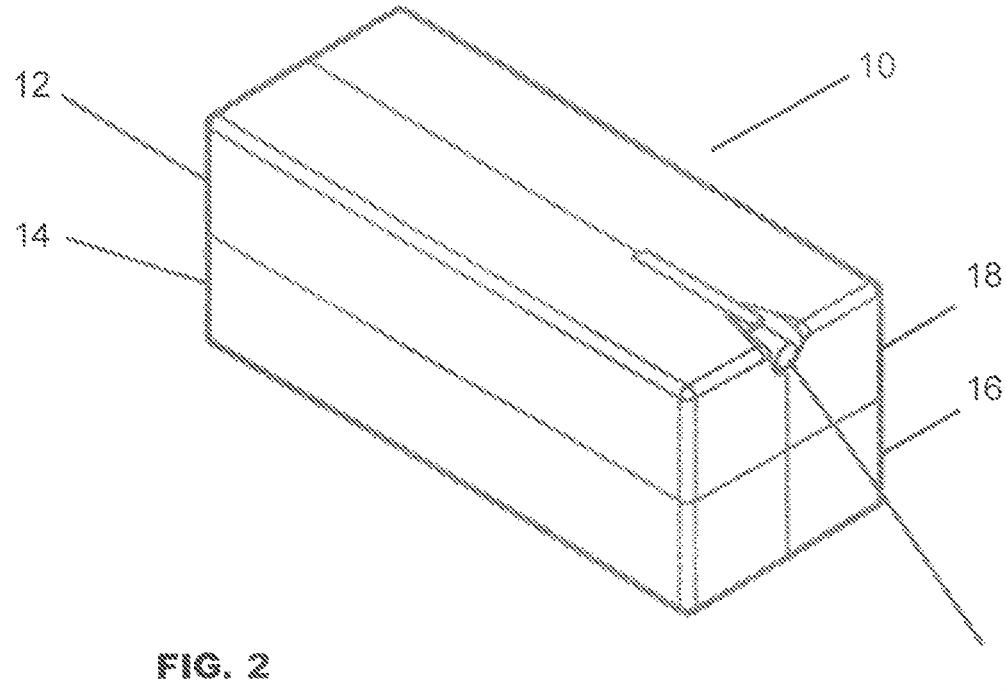
FIG. 2 is an isometric view of the apparatus illustrated in FIG. 1.
Figure 3:
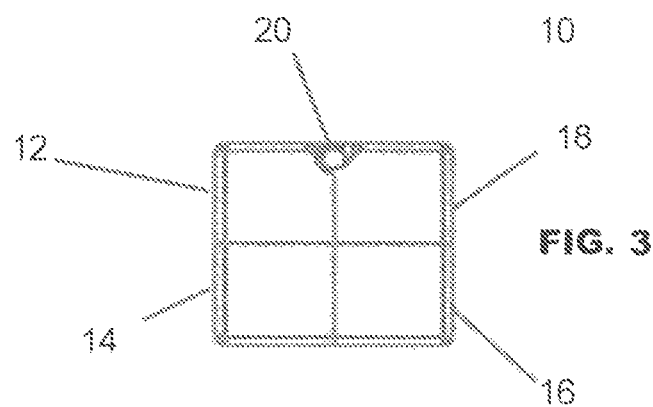
FIG. 3 is a front view of the apparatus illustrated in FIG. 1.
Figure 4:
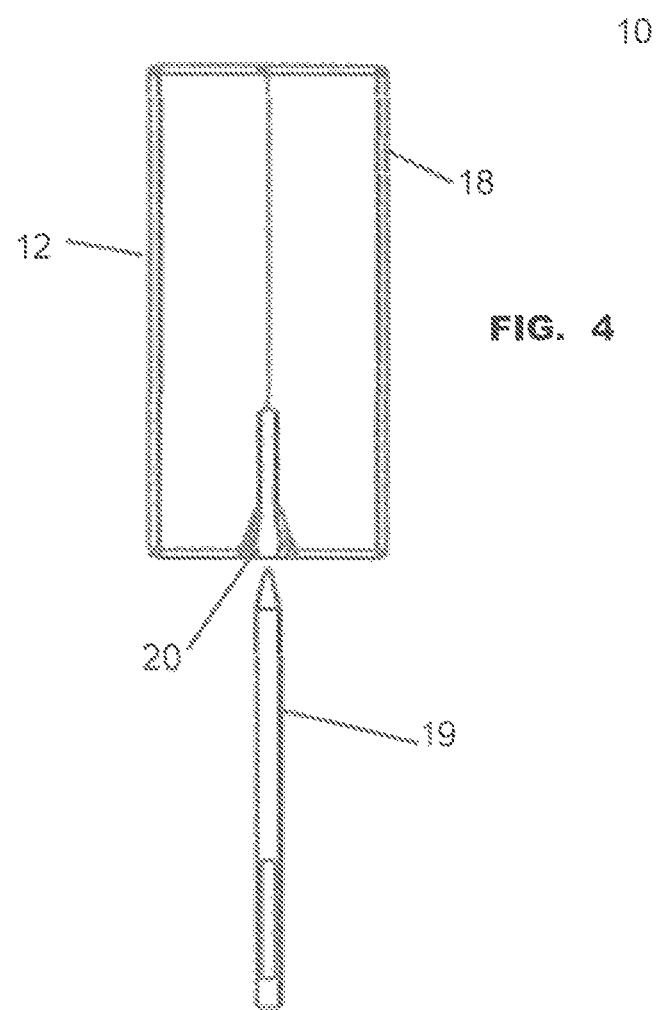
FIG. 4 is a top exploded view of the apparatus illustrated in FIG. 1 showing a pencil in exploded relation.
Figure 5:
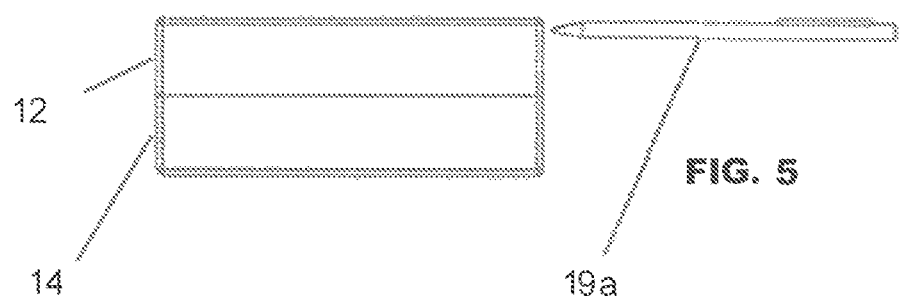
FIG. 5 is a sided exploded view of the apparatus illustrated in FIG. 1 showing a pencil in exploded relation.
Figure 6:
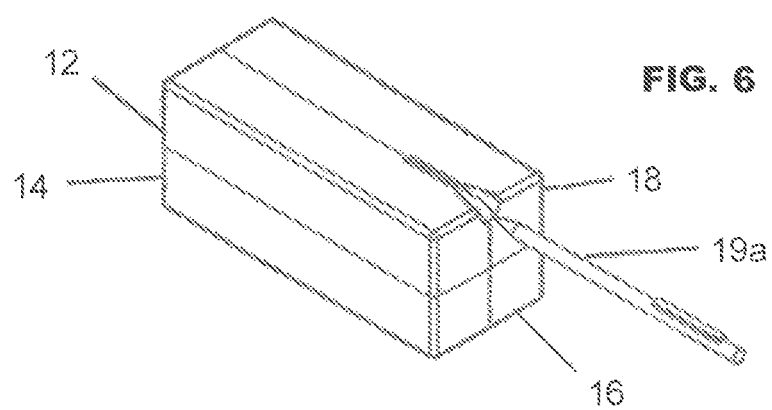
FIG. 6 is an exploded isometric of the apparatus illustrated in FIG. 1 showing a pencil in exploded relation.
Figure 7:
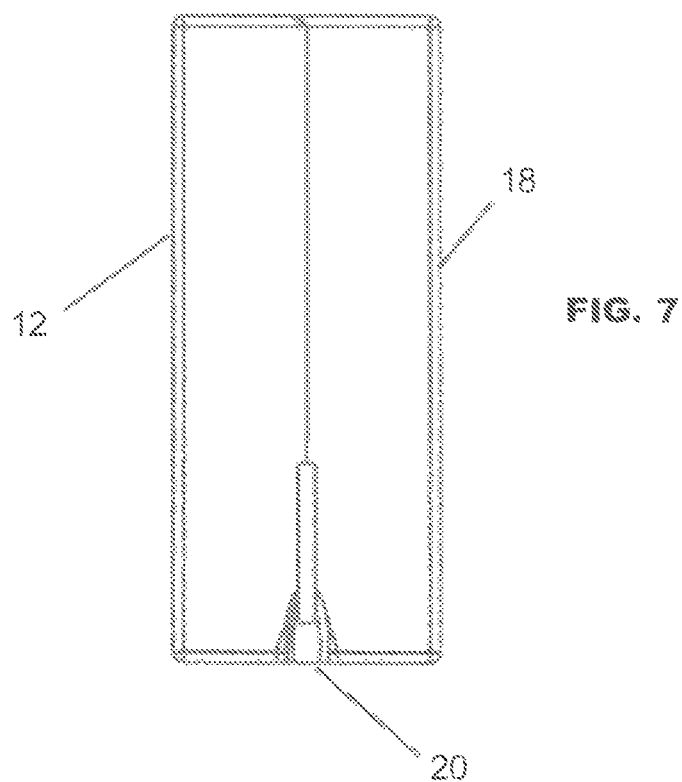
FIG. 7 is a top view of the apparatus illustrated in FIG. 1.

The overall structure of the in accordance with one form of the present invention is shown in FIGS. 1-7. The domino case 10 comprises four fundamental parts. They are the upper left cover 12, the lower left base 14 the lower right base 16 and the upper right cover 18.

The four fundamental parts mesh together to provide a fully sealed structure to enclose a set of dominoes. The four fundamental parts are constrained in the assembled positioned by placement of a pencil 19a. The pencil engages circular surfaces on both the upper left cover 12 as well as the upper right cover 18. When engaged in this manner the user has in a single bundle the four fundamental parts together with a pencil 19a in pencil slot 20. The pencil 19a is used for scorekeeping.

Figure 17:
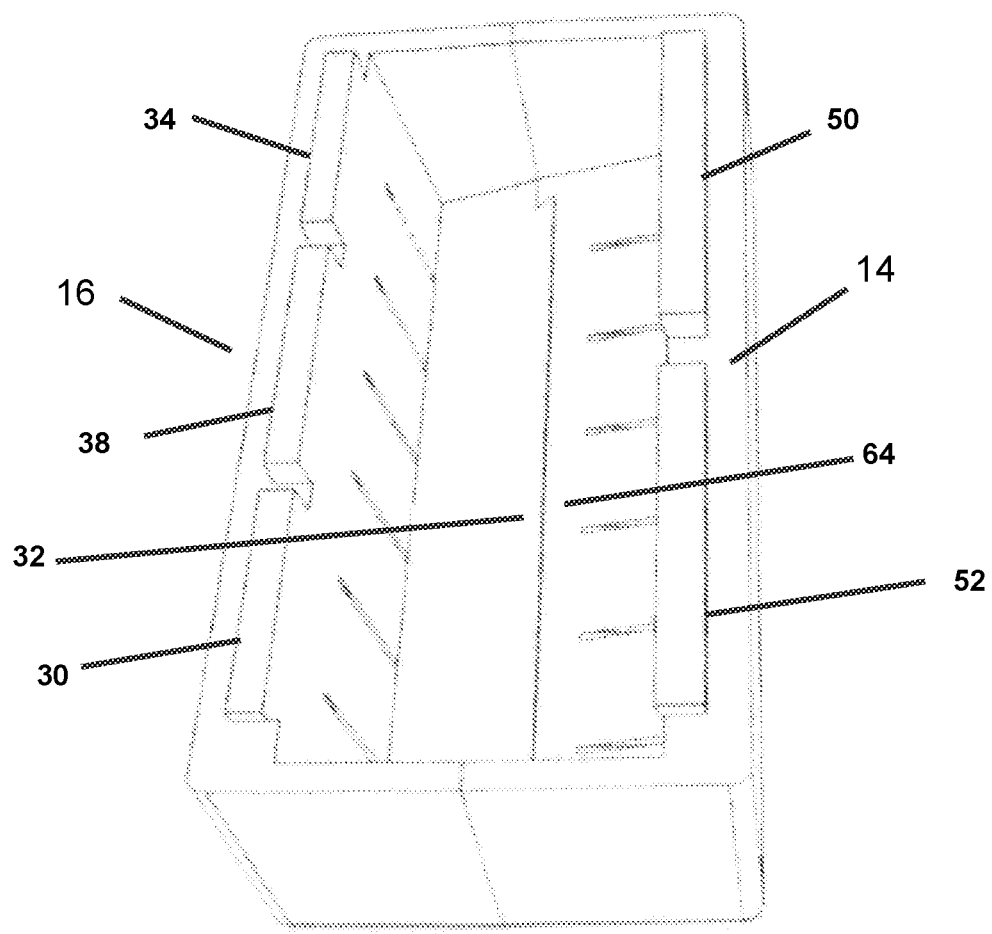
FIG. 17 is an isometric view illustrating the engagement between the lower left base 14 and the lower right base 16.
Figure 18:
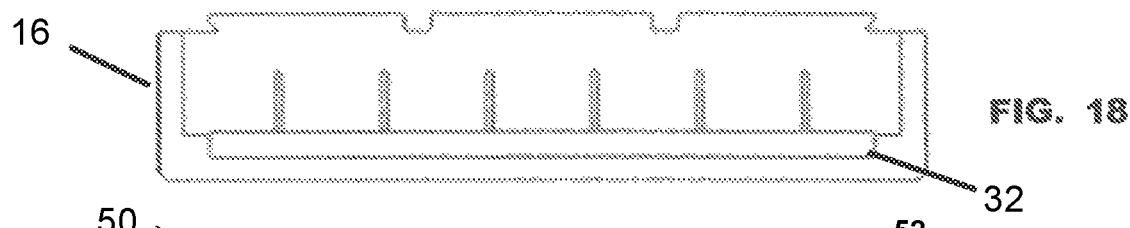
FIG. 18 is a view of the lower right base 16.
Figure 19:
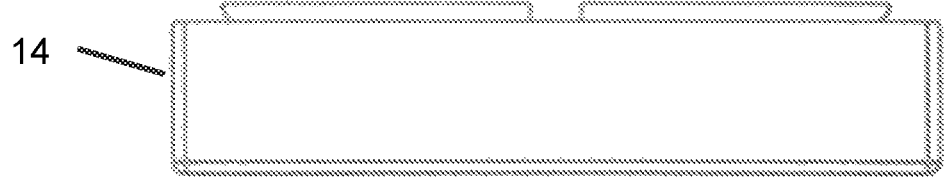
FIG. 19 is a view of the lower left base 14
Figure 20:
FIG. 20 is an isometric view of the lower right base 16.
Figure 21:
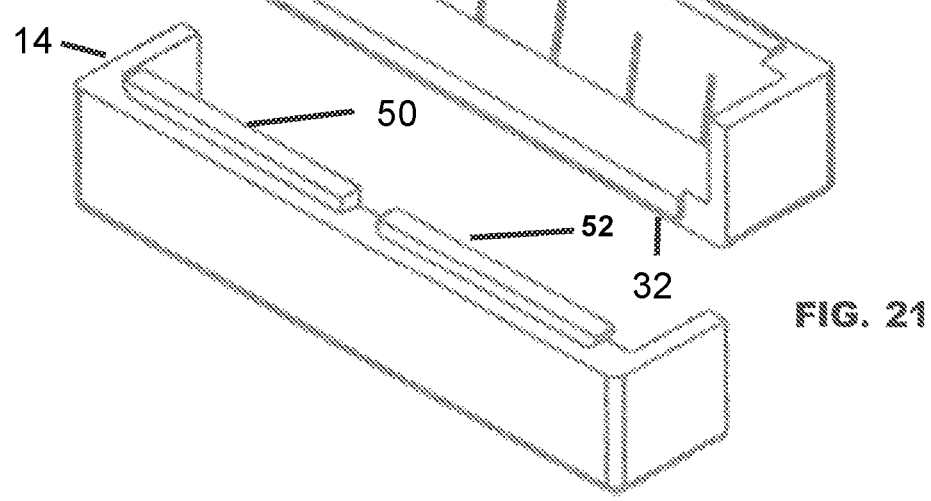
FIG. 21 is an isometric view of lower left base 14.
Figure 27:
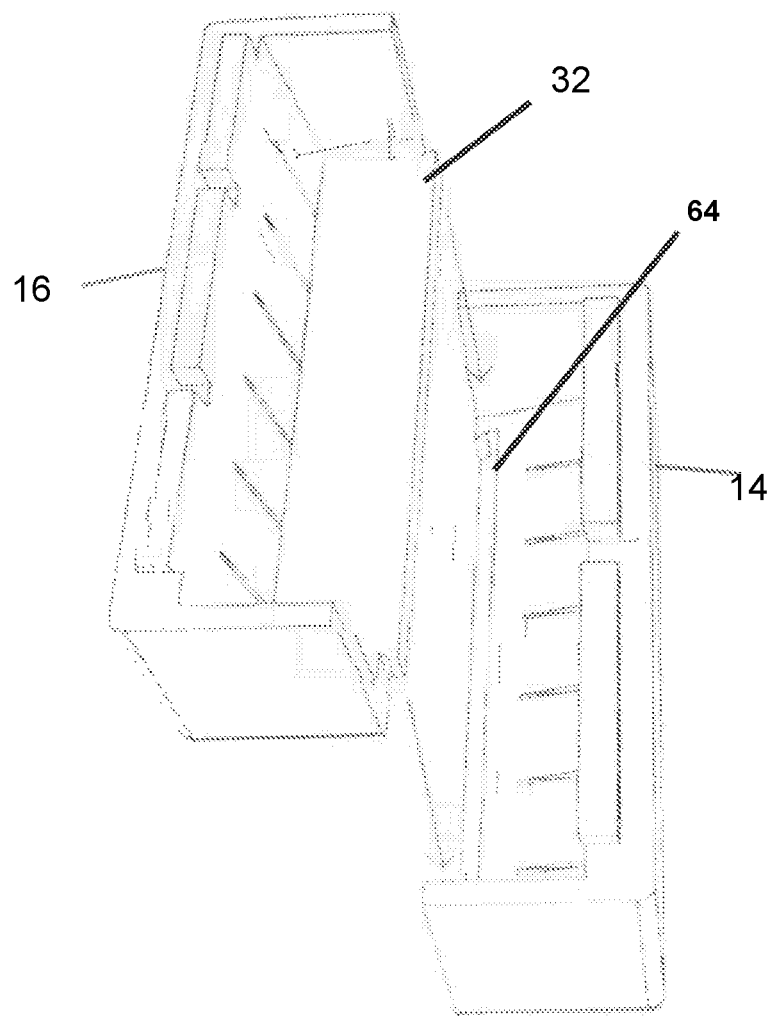
FIG. 27 is an exploded isometric view illustrating the engagement between the two base members 14, 16 of the apparatus illustrated in FIG. 1.

The assembly of the lower right base 16 and the lower left base 14 is best understood by reference to FIGS. 17 and 27 as well as FIGS. 20 and 21. The lower right base 16 is provided with a tab 32 having notched ends that mesh mating recesses of the lower left base 14. As particularly evident in FIG. 27 a tab 32 that engages the recess 34. The thickness or height of the tab 32 as well as the recess 34 is less than the thickness of the other parts of the respective floors. Accordingly, the interface between the lower left base 14 and the lower right base16 constrains relative movement therebetween.

FIG. 17 further illustrates tabs 30, 34, 38 50 and 52.as well as tab 32 that engages recess 64

Figure 16:
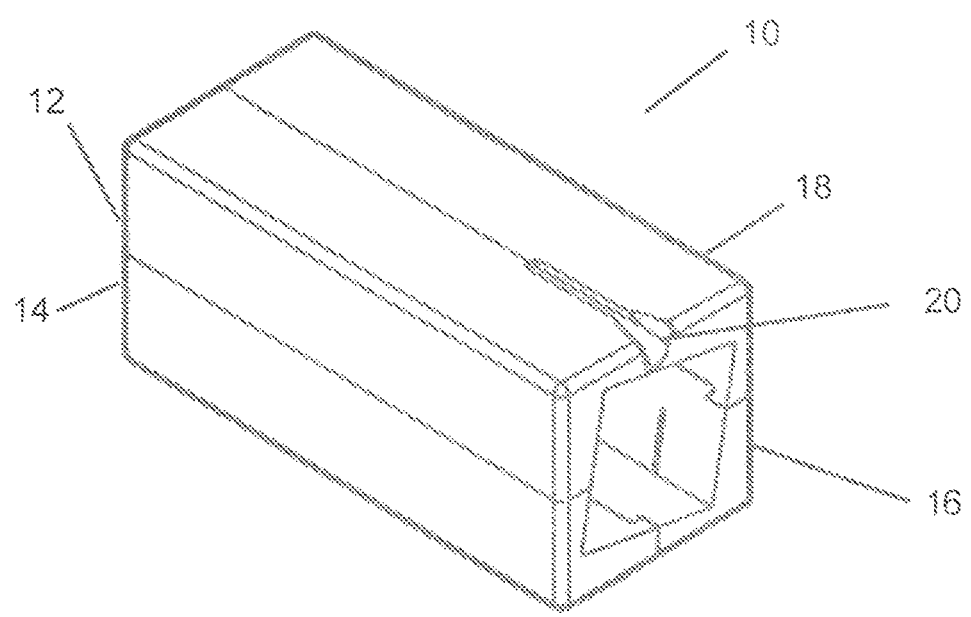
FIG. 16 is a fragmentary isometric view of the apparatus illustrated in FIG. with a cross-section taken at a plane that is parallel to and just behind the front face thereof.
Figure 34:
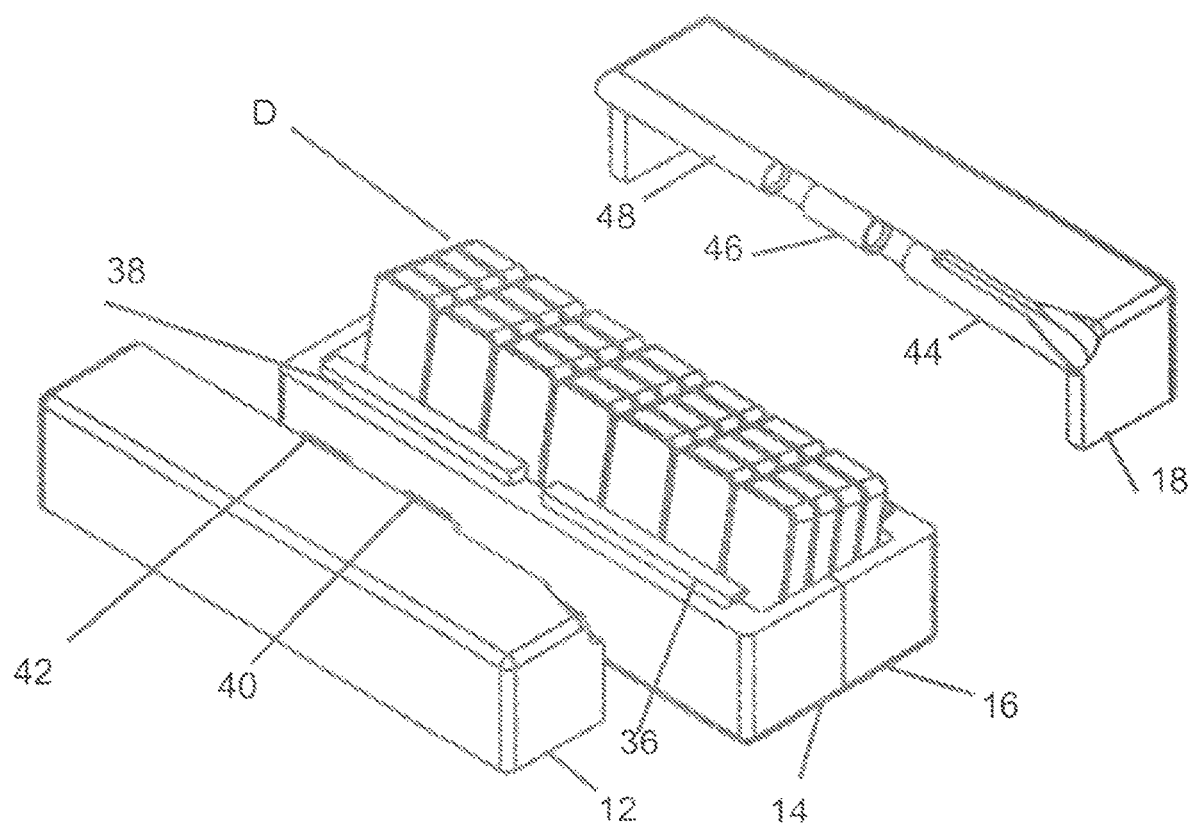
FIG. 34 is an exploded view displaying the upper covers 12, 18 in exploded relationship with dominos seated in bases 14, 16.

The subsequent assembly of the upper right cover 18 and the upper left cover 12 to the assembly described above is best understood by reference to FIGS. 28-33 as well As FIG. 34. The upper left cover 12 has two coaxial sleeves 40, 42. The upper right cover 18 has three coaxial sleeves 44, 46, 48. When fully assembled, all the sleeves are coaxial and all sleeves have the same inside and outside dimensions. The two sleeves 40, 42 are axially interspersed with respect to sleeves 44, 46, 48. Thus, the sleeves 40, 42, 44, 46, 48 collectively form the slot 20. The axial extremity of the sleeve 44 has a counter sink to accommodate a pencil clip on the pencil 19a. This countersink is also visible in FIGS. 2,3, 4, 6, and 34. As shown in FIGS. 23-26 Each stand is provide six parallel lines defining eight discrete areas for receiving a tile as well as defining the substantially vertical "back" of each stand. The meshing of the As best seen in FIG. 16, the cut away assembled upper right cover 18, the lower right base 16, the lower left base 14, and the upper left cover 12 have a square cross section. To optimize construction of the trays that will be utilized by players, the interior surfaces of the mating bases 14, 16 and covers 12 and 18 collectively define a square cross section cavity having walls that are disposed in oblique relation to the outer walls of the domino case 10.

The assembly of the upper left cover 12, the lower left base 14 the lower right base 16 and the upper right cover 18 includes meshing tabs and recesses. Examples of such tabs include tabs 30, 36.

As best shown in FIG. 29 the lower left base 14 and the lower right base 16 when engaged and loaded with dominos D provides a space 60 for a players score sheet.

FIGS. 23-26 collectively show slot 64 that mates with tab 32; slot 54 that mates with tab 52; slot 56 that mates with tab 50; slot 62 that mates with tab 34; slot 60 that mates with tab 38; and slot 58 that mates with tab 30.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims. While certain embodiments of the invention have been illustrated and described, various modifications are contemplated and can be made without departing from the spirit and scope of the invention. Accordingly, it is intended that the invention is not to be limited, except as by the appended claim(s).

The teachings disclosed herein may be applied to other systems and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the present invention with which that terminology is associated. In general, the terms used in the following claims should not be constructed to limit the present invention to the specific embodiments disclosed in the specification unless the above description section explicitly define such terms. Accordingly, the actual scope encompasses not only the disclosed embodiments, but also all equivalent ways of practicing or implementing the disclosed present invention. The above description of embodiments of the present invention is not intended to be exhaustive or limited to the precise form disclosed above or to a particular field of usage.

While certain aspects of the present invention are presented below in particular claim forms, various aspects of the present invention are contemplated in any number of claim forms. Thus, the inventor reserves the right to add additional claims after filing the application to pursue such additional claim forms for other aspects of the present invention.

What is claimed is:

1. A domino box which comprises:
    an elongated cuboid hollow shell having a rectangular top and bottom faces and rectangular first and second side faces;
    said elongated cuboid hollow shell having an elongated cuboid space within said shell having rectangular top and bottom faces as well as rectangular first and second side faces, each of said top and bottom faces of said elongated cuboid space being disposed in oblique relationship to said top and bottom faces of said elongated cuboid shell, each of said first and second side faces of said elongated cuboid space being disposed in oblique relationship to said first and second side faces of said elongated cuboid shell;

said elongated cuboid hollow shell being divided by a first virtual plane disposed midway between said top and bottom faces as well as parallel to said top and bottom faces;

said elongated cuboid hollow shell being divided by a second virtual plane disposed midway between said first and second side faces as well as parallel to said first and second side faces;

whereby said elongated cuboid hollow shell is divided into first and second elongated cover quadrant sections as well as first and second elongated base quadrant sections; each of said first and second cover quadrant sections as well as each of said first and second base quadrant sections that each function as trays or displaying game tiles is by a single player.

2. The apparatus as described in claim 1 wherein said first base quadrant section includes a recess in the bottom thereof; and said second base quadrant section includes a lip dimensioned and configured for engaging said recess.

3. The apparatus as described in claim 2 wherein said recess in said first base quadrant section is disposed in only a part of the thickness of said elongated first base quadrant section.

4. The apparatus as described in claim 3 wherein said recess has a pointed extremity.

5. The apparatus as described in claim 4 wherein said pointed extremity is disposed proximate to an axial extremity of said elongated first base quadrant section.

6. The apparatus as described in claim 1 wherein said first and second elongated cover quadrant sections include respective coaxial sleeves for receiving a writing implement whereby said first and second elongated cover quadrant sections are secured together.

7. The apparatus as described in claim 1 is made with an additive manufacturing process.

\* \* \* \* \*